(No Model.) 5 Sheets—Sheet 1.

C. M. PETERSON.
SHEAF CARRIER.

No. 436,188. Patented Sept. 9, 1890.

FIG. 1.

ATTEST.
J Henry Kaiser
Victor J. Evans

INVENTOR
Charles Magnus Peterson
by Franck D. Johns
Attorney (No Model.) 5 Sheets—Sheet 3.

C. M. PETERSON.
SHEAF CARRIER.

No. 436,188. Patented Sept. 9, 1890.

ATTEST.
J. Henry Kaiser
Victor J. Evans.

INVENTOR.
Charles Magnus Peterson
by Franck D. Johns
Attorney (No Model.) 5 Sheets—Sheet 4.

C. M. PETERSON.
SHEAF CARRIER.

No. 436,188. Patented Sept. 9, 1890.

ATTEST.
J. Henry Kaiser
Victor J. Evans

INVENTOR.
Charles Magnus Peterson
by Franck D. Johne (No Model.) 5 Sheets—Sheet 5.

C. M. PETERSON.
SHEAF CARRIER.

No. 436,188. Patented Sept. 9, 1890.

ATTEST.
J. Henry Kaiser.
Victor J. Evans.

INVENTOR.
Charles Magnus Peterson
by Franck D. Johne
Attorney

UNITED STATES PATENT OFFICE.

CHARLES MAGNUS PETERSON, OF SENECA, MISSOURI.

SHEAF-CARRIER.

SPECIFICATION forming part of Letters Patent No. 436,188, dated September 9, 1890.

Application filed March 1, 1889. Serial No. 301,651. (No model.)

*To all whom it may concern:*

Be it known that I, CHARLES MAGNUS PETERSON, a citizen of the United States, residing at Seneca, in the county of Newton and State of Missouri, have invented certain new and useful Improvements in Sheaf-Carriers for Harvester-Binders; and I do hereby declare the following to be a full, clear, and exact description of the invention, such as will enable others skilled in the art to which it appertains to make and use the same.

My invention relates to improvements in sheaf carriers and droppers for harvester-binders; and it consists in certain novelty in the details of the construction, arrangement, and combination of the various parts of the same, all of which I will now proceed to point out and describe, reference being had to the accompanying drawings, in which—

Referring to said drawings, 1 represents a part of the main frame of a self-binding harvester.

2 is the inclined elevator-frame mounted on suitable supports secured to the main frame.

3 is the delivery-board which conveys the grain from the elevator to the binding-table. To the upper cross-timber 4 of the elevator-frame is secured a shield 5, which projects over the binding-table.

The elevator, carrying and driving wheels, and other parts of the harvester are not shown, as they form no part of my invention, and it is not necessary to describe them. Any preferred form of harvester may be used.

On top of the outer timber 8 of the frame are secured guides or ways 9.

10 are upright supports having grooved ends which engage with and are adapted to slide on said guides 9.

11 is the binding-table, mounted on the supports 10. The forward support 10 has an upwardly-extended portion 12, on the end of which is formed a rearwardly-extending bracket 13, projecting over the binding-table. To the rear end of said bracket 13 is secured an upwardly-projecting arm 14, having a grooved end which engages with a flanged guide or way 15, secured on top of the elevator-frame, said guide being parallel with the guides 9. It will readily be seen that by sliding the supports 10 and arm 14 on the guides the binding-table may be moved backward or forward and adjusted so as to accommodate the binding mechanism to straw of different lengths. In the present instance the binding mechanism is not shown, as it forms no part of my invention. Any preferred form may be used.

On the rear of the bracket 13 is secured an arm 16, in which is formed a bearing 17.

18 and 19 are bearings formed on the bracket in a line with the bearing 17. In said bearings is mounted a driving-shaft 20, which operates the ejecting-arms 22. Said ejecting-arms are pivotally secured to a double crank 21 formed on the driving-shaft, their upper ends being pivoted to a forked arm 23, the end of which is pivoted to the bracket. Said driving-shaft is connected by any suitable intermediate mechanism with the binding mechanism, and is so arranged that it will rotate and cause the ejecting-arms to discharge the bundle from the binding-table as it is bound. In the present instance I show a sprocket-wheel 24, mounted on the end of the shaft 20, which is adapted to be connected by a sprocket-chain with said binding mechanism. Such mechanism, however, is common to all harvester-binders of this class and need not be more particularly described, as its operation will be readily understood.

25 is a short arm secured to and projecting at right angles from the forward end of the outer timber 8 of the main frame, said arm having a plane surface on its rear side. In the present instance the arm is formed in the shape of an angle-iron for convenience in attaching it to the timber 8, and is secured by bolts and nuts, as shown.

26 is a casting having a plane surface resting against the plane surface of the arm 25 and pivoted to said arm by a thumb-screw 27, the smooth portion of the shank of the screw resting in a bearing 28 formed in the arm 25. Instead of this thumb-screw, a pin or bolt may be used.

In the casting are two holes 30 and 31, arranged in the arc of a circle having the pivotal point of the casting as a center.

32 is a spring-actuated pin mounted in the outer end of the arm 25 and adapted to engage with either one of the holes 30 or 31, to hold said casting in different positions with relation to the arm 25, for a purpose hereinafter described.

33 is the bundle carrier and dropper, composed of the end bar 34 and inner side bar 35, secured to each other at right angles and having rearwardly-projecting fingers 36 secured to the end bar 34 and extending back substantially parallel with the side bar 35, which is, when in a position to receive the sheaves, substantially parallel with the timber 8, said carrier being located below the binding-table. To the outer end of the bar 34 is attached a raised guard-rail 37. At the inner forward corner of the carrier is attached a casting 38, on which is formed an inwardly-projecting journal 39, which is mounted in a bearing 40, formed in the casting 26, the carrier thus being pivoted in a line transverse to the line of draft of the harvester, permitting said carrier to tilt backward to discharge the sheaves. When the sheaf-carrier is in position to receive the sheaves, the pin 32 is in engagement with the upper hole 31 in the casting 26.

41 is a guard-board hinged to the side bar of the carrier. When said carrier is in an operative position, the guard-board is held in a substantially vertical position alongside of the side bar 35 by means of a hook 42, secured to said side bar and engaging with an eye on the back of the board. When the carrier is in an inoperative position, said guard is folded down on the fingers of the carrier.

43 is a casting, preferably formed in two parts, as shown, and secured to and projecting from the timber 8 of the frame. 44 is a vertical bearing formed in said casting. 45 is a short vertical shaft mounted in said bearing 44, having secured to its lower end a crank-retaining stop 455, adapted to engage with a projection 112 on a casting 113, secured to the side bar of the sheaf-carrier and hold said carrier in a position to receive the sheaves, said stop being normally held in engagement with the carrier by means of a spiral spring 46, which surrounds the shaft 45, one end being secured to the shaft and the other to the bearing. 47 is a crank-arm secured to the upper end of said shaft 45.

In the construction shown I secure the several parts together by a bolt 48, passing through the shaft 45. Said shaft, crank-arm, and stop may, however, be formed integral, if desired.

On the inner end of the crank-stop is formed a stop 49, which engages with a stop 49' on the casting and limits the movement of the retaining-stop.

50 are arms secured to and projecting from and below the lower edge of the binding-table. 51 are bearings on said arms. 52 is a rock-shaft mounted in said bearings and having the crank portion 53.

54 are rock-arms mounted on the rock-shaft and secured thereto, so as to rock with said shaft, by means of pins 55, engaging with notches 56 in the ends of said arms, said notches being sufficiently large to permit the arms to have a slight movement on the shaft. The lower ends of the rock-arms are connected by a rod 57.

58 is a swivel on the end of the crank-arm 47, having in its upper end a transverse aperture 59, through which the rod 57 passes, said aperture being large enough to permit the rod to have a slight play therein, so that the arms may be rocked.

60 is a stop on the swivel, which engages with stops 61 on the arm 47 and limits the movement of said swivel with relation to said arm.

When the rock-shaft is rocked by the mechanism hereinafter described through its connection with the shaft 44, it turns said shaft in its bearing against the tension of the spring 46 and withdraws the retaining-stop from engagement with the carrier, for a purpose hereinafter set forth.

The bearings 51 and rock-shaft are located below the plane of the binding-table, so that the sheaves readily pass over the same when discharged from said binding-table.

160 is a bracket secured to and projecting outwardly at right angles from the bracket 13 at a point above the forward end of the binding-table. Said bracket 160 may be secured in any suitable manner to the bracket 13. In the present instance the bracket 13 is formed I-shaped in cross-section, and the bracket 160 is provided with a lip or projection 161, which engages with the outer lower flange of said bracket 13 and a detachable plate 62, having a lip or projection 63, which engages with the inner lower flange of the bracket 13, the several parts being held together by a set-screw 64. This construction facilitates the attachment and removal of the bracket 160. The outer end of said bracket 160 is enlarged, and to the same is rigidly secured a spindle 65, projecting at right angles from the same and being parallel with the shaft 20.

66 is a gear mounted on the spindle and having formed on its side next to the bracket a ratchet 67, with which a spring-actuated pawl 68 engages and permits the rotation of the gear in one direction, said pawl being pivoted to the bracket and provided with an actuating-spring 69. On the opposite side of the gear are formed clutch-teeth 70.

71 is a short sleeve loosely mounted upon and adapted to slide on the spindle, and having formed on its end next to the gear clutch-teeth 72, which are adapted to engage with the teeth 70, said teeth 70 and 72 forming the two sections of a clutch controlling the mechanism operating the retaining-stop, as hereinafter described. Said clutch-sections are normally held in engagement by means of a spiral spring 170, located within the sleeve and secured at one end to the spindle, its free end engaging with an inner annular shoulder 171 in said sleeve.

172 is a collar mounted on and adapted to have a limited sliding movement on the spindle, being splined to said spindle by means of a key 73 on said spindle engaging with a key-seat 74 in the collar. The inner end of the collar projects under the outer end of the sleeve, and is connected thereto by keys 75, secured in the sleeve and engaging with an annular groove in the collar. This construction permits the sleeve to rotate on the spindle, but slides the same with the collar when said collar is moved.

76 is a spiral cam-slot in the collar 172.

The outer end of the spindle is shouldered, having a reduced end 77 projecting beyond the shoulder.

78 is a lever-arm pivoted on the reduced end of the spindle and projecting through the cam-slot 76, said collar and lever being held on the spindle by a cap or head 79, secured to the end of the spindle by a screw 80. Said cap or head is also provided with a key 81, which is in a line with the key on the spindle and engages with the key-seat in the collar.

82 is a spring encircling the reduced end of the spindle and secured to said spindle and lever so as to hold the lever normally in the outer end of the cam-slot.

83 is a rod pivotally secured at one end to the outer end of the lever-arm, and is mounted in a guide 84. Said rod is provided with a locking-notch 85, adapted to engage with the lower edge of the guide, and a spring 86 to hold the same in engagement, the handle of said rod being located within convenient reach of the driver.

When the several parts of my invention are in an operative position, the lever-arm 78 is in engagement with the outer end of the cam-slot and the sleeve is held in engagement with the gear by means of its spring. To disengage the sleeve, the rod 83 is drawn in toward the machine and moves the lever-arm 78 toward the frame. As said lever-arm engages with the cam-slot, it slides the collar 172 out on the spindle, and the sleeve 71, moving with said collar, disengages the clutch-sections.

88 is a cam projection formed on the sleeve 71, which is adapted to engage and operate a trip-lever 89, pivoted to one side of the bracket.

90 is a link or rod pivotally secured to one end of the trip-lever, its other end being pivoted to the crank of the rock-shaft 52.

91 is a segment-pinion rigidly mounted upon the shaft 20. This segment-pinion engages the gear 66 at each revolution of the shaft 20. It will be remembered that with each revolution of said shaft 20 the ejecting-arms discharge a sheaf from the binding-table. In the present instance the gear 66 is provided with eighteen teeth and the segment-pinion with three teeth. It therefore takes six revolutions of the shaft 20 and its pinion to effect one revolution of the gear 66. When the several parts heretofore described are in engagement, the sleeve 71 revolves with the gear 66, and when said gear has completed its revolution the cam projection 88 on said sleeve engages with the free end of the trip-lever 89, trips the same and through the link or arm 90 rocks the rock-shaft which, by means of the rock-arms and their swivel connection with the short shaft carrying the retaining-stop, turns said shaft in its bearing against the tension of its spring and withdraws the said retaining-stop from engagement with the sheaf-carrier, the weight of the sheaves upon said carrier causing it to tilt or swing backward and downward and discharge the sheaves which have accumulated upon the same. As the shaft operating the ejecting-arms has made six revolutions while the gear 66 has made one revolution, it will readily be seen that six sheaves will accumulate upon the carrier before being discharged, the number of sheaves which the carrier will retain before discharging the same being regulated by the proportionate number of teeth in the gear 66 and the segment-pinion. As the cam projection passes and releases the trip-lever the spring connected with the short shaft carrying the retaining-stop operates to turn said shaft, and return the retaining-stop in position to again engage the carrier.

93 is a short arm swiveled in the casting 113, secured to the side bar of the carrier. To the outer end of the arm 93 is pivoted or hinged an arm 94, thus forming substantially a double-hinged connection between said arm and the side bar of the carrier. The outer end of the arm 94 is provided with a swiveled end or head 96, having in its end a slot 194 and an overhanging lip 195.

196 is a bearing secured to and projecting from the side bar 8 of the main frame at a point back of the journal-bearing of the carrier.

97 is a pin mounted in said bearing, to which is secured one end of a coil-spring 98, having a loop 198 formed on its free end which engages with the slot in the swiveled head or end 96 of the arm or joint 94. Said spring is so arranged that when the carrier has received the desired or predetermined number of sheaves and is released from the retaining-stop 455 and tilts to discharge said sheaves it carries the arm or joint 94 down against the tension of the spring, the double-hinged connection between the arm or joint and the carrier and its swiveled connection with the spring permitting said movement. As the sheaves are discharged, the spring 98 returns the carrier to be again engaged by its retaining-stop. Said spring 98 is of greater tension than the spring 46, and the under side of the retaining-stop is beveled, so that when the upper beveled side of the casting 113 strikes said stop it is readily forced back to permit the return of the carrier in position to receive the sheaves. The double-hinged connection of the arm or joint 94 with the carrier and its swiveled connection with the spring permits said carrier not only to be tilted, as above described, to discharge the sheaves, but also to be folded up by the side of the binding-table in convenient position for transportation. The means employed for connecting the spring to the swiveled head of the arm or joint prevents said spring from becoming disengaged from said head when the arm or joint is moved.

When in position for transportation, the pin 32 is in engagement with the hole 30 in the casting 26, said casting having been moved on its pivot until the carrier reaches the desired elevation. This arrangement of the carrier greatly facilitates the transportation of the harvester when not in operation.

Figure 1:
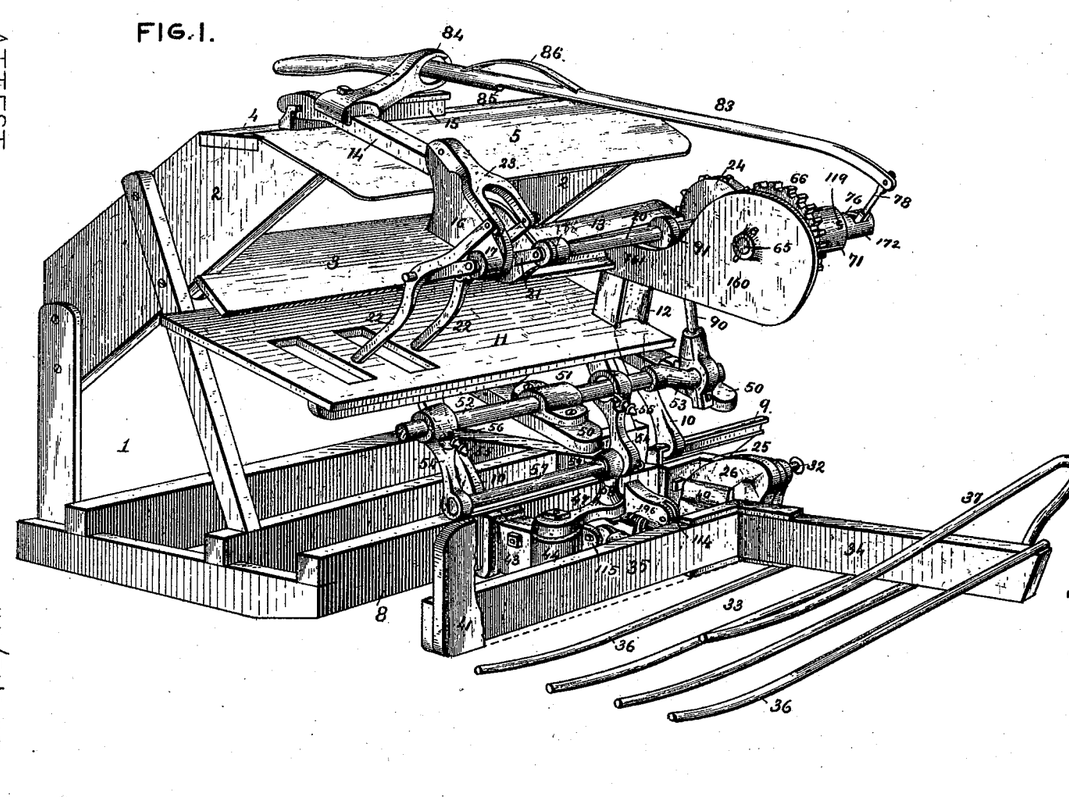
Figure 1 is a perspective of my said invention, showing the carrier in position to receive the sheaves.
Figure 2:
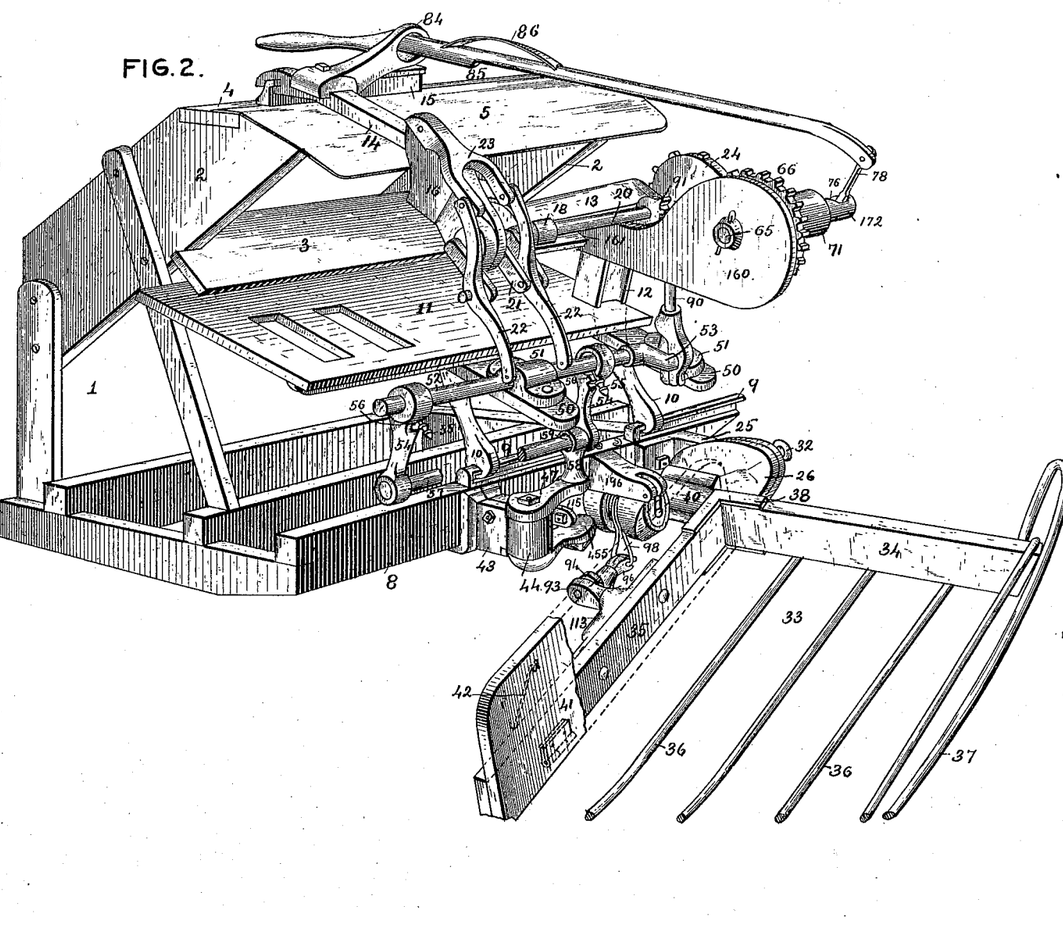
Fig. 2 is a perspective of the same, showing the position of the carrier and operative mechanism of the stop when discharging the sheaves.
Figures 3, 17, 18:
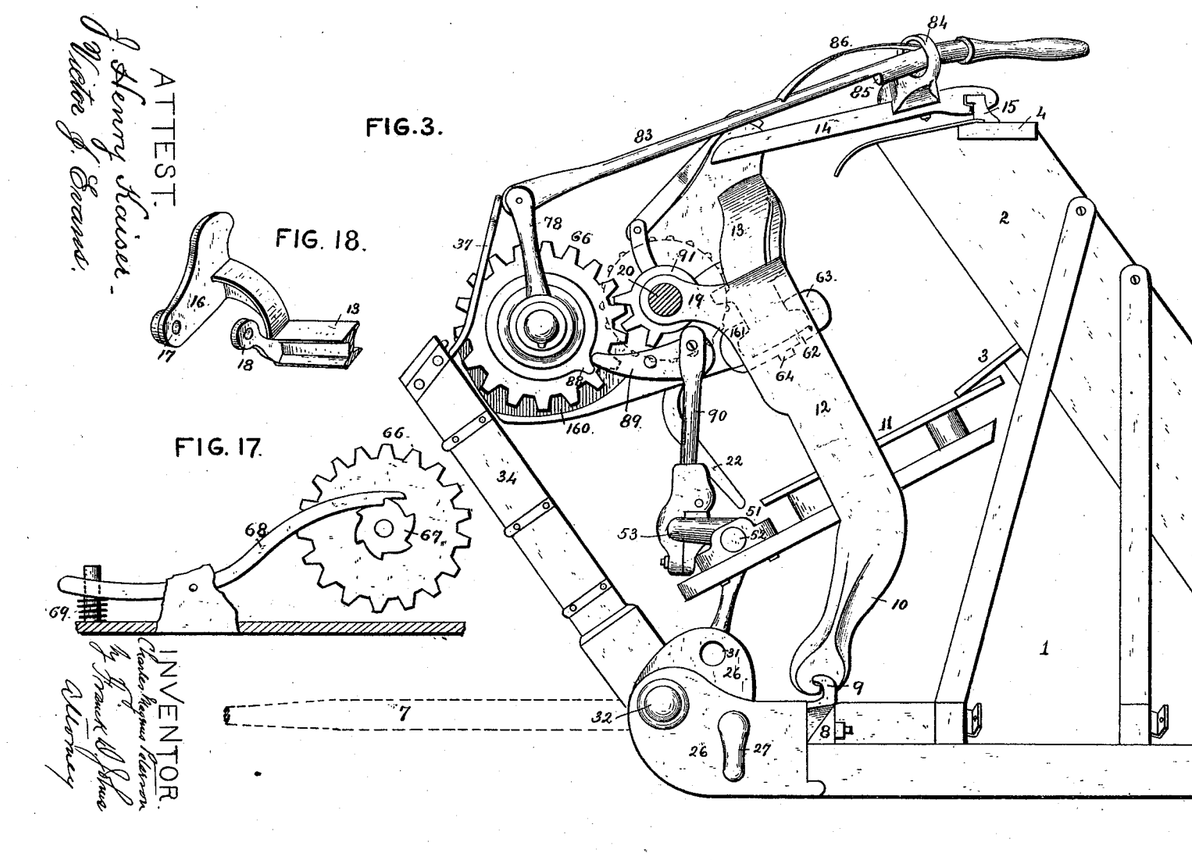
Fig. 3 is a side elevation showing the position of the carrier.
Fig. 17, a detail of the pawl and ratchet controlling the operating-gear.
Fig. 18 is a detail of one end of the supporting-bracket.
Figures 4, 5, 6, 7, 8:
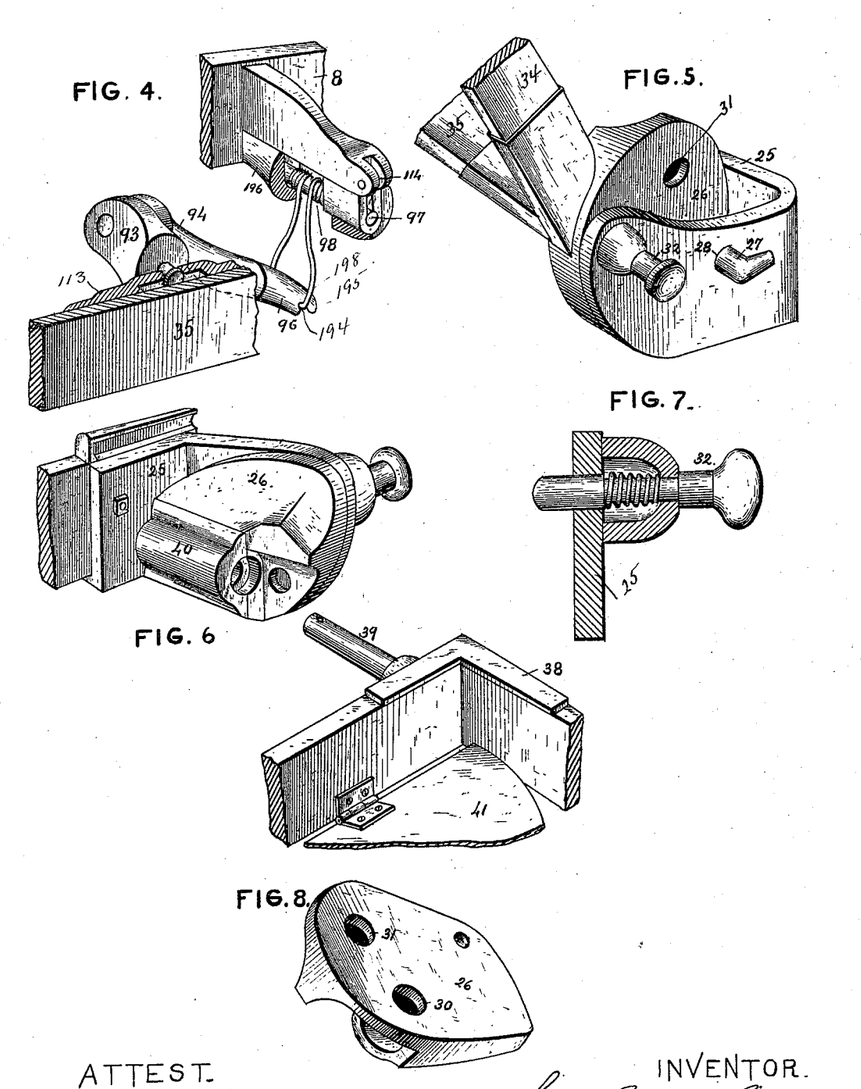
Fig. 4 is a detail illustrating the mechanism for returning the carrier in position to receive the sheaves.
Figs. 5, 6, 7, and 8 are details illustrating the means for securing the carrier to the harvester-frame.
Figure 9:
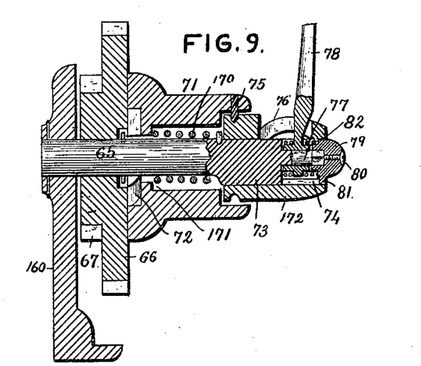
Fig. 9 is a detail in section showing the clutch-mechanism and gear for operating the releasing mechanism.
Figure 10:
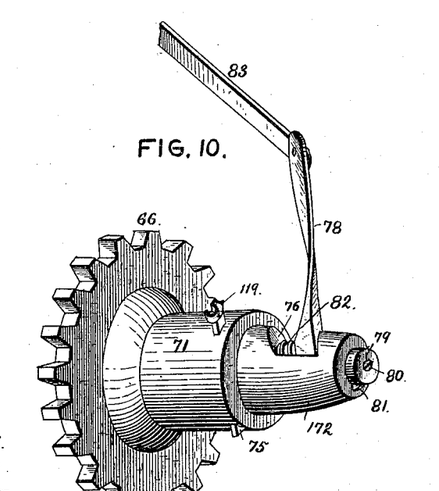
Fig. 10, a perspective of the mechanism shown in Fig. 9.
Figure 11:
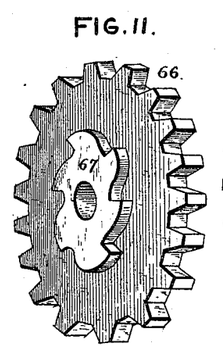
Figs. 11, 12, 13, 14, and 15 are further details of said clutch mechanism and operating-gear.
Figure 12:
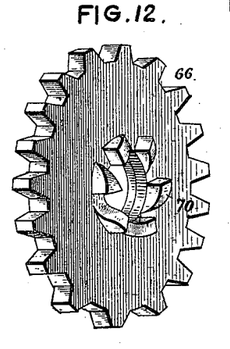
Figures 13, 14, 16:
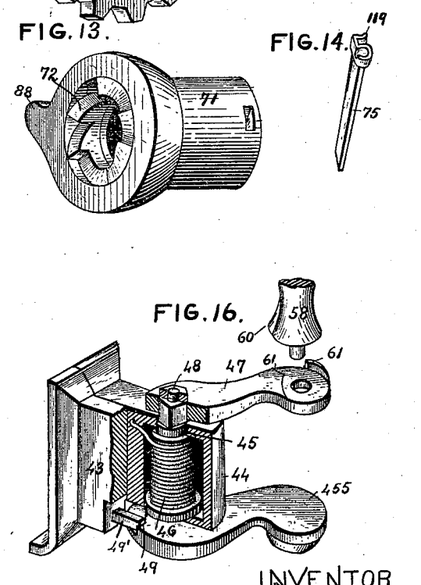
Fig. 16 is a detail, partly in section, illustrating the retaining-stop and its operating mechanism.
Figure 15:
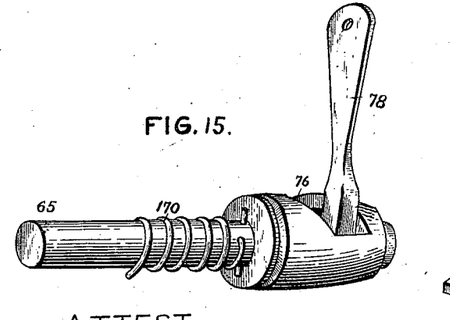

Secured to the bearing 196 is a bifurcated lug 114, and to the bearing 44 a lug 115, to which the thill-irons of the tongue may be attached when it is desired to haul the harvester upon a truck for transportation. When the tongue 7 is attached to said lugs, the carrier is folded up, and said tongue extends under the side bar of said carrier, as shown in dotted lines, Fig. 3.

On the sleeve 71 is an indicator 119, which in the present instance is a figure 5. When this appears on top of the sleeve, it being presumed to have started from that point, it indicates that said sleeve has made one revolution and that the ejecting-arms have discharged five bundles from the binding-table. The operator is thus informed that the carrier will discharge said sheaves at the next revolution of the shaft 20. If for any reason it is desired to retain the bundles upon the carrier by means of the rod connecting with the lever controlling the clutch mechanism the operator can disengage the clutch-sections and prevent the stop mechanism from operating, and thus hold the retaining-stop in engagement with the carrier.

The operator thus has at all times control over the mechanism operating the retaining-stop. This feature of the invention is of especial advantage, for instance, in turning corners when it it is desired to carry the sheaves around to the next row.

The operation of the several parts of my invention have been heretofore described. Its general operation when in action will be readily understood. The carrier is held in position to receive the sheaves by the spring-actuated retaining-stop engaging with the same. Said sheaves are discharged from the binding-table by the ejecting-arms until a predetermined number have accumulated upon the carrier. Then, through the mechanism described, the stop is automatically disengaged from the carrier and the weight of the sheaves causes it to tilt and discharge the same. When released from the weight of said sheaves, the spring connected with said carrier returns it to a position to be again engaged by the retaining-stop.

It is obvious that various changes may be made in the details of construction of my said invention without materially departing from the spirit and scope of the same, and I do not limit myself to the specific construction herein set forth; but

What I claim as new, and desire to secure by Letters Patent, is—

1. In a harvester-binder, the combination, with a binding-table, a driving-shaft, and an ejector operated by said shaft, of a sheaf-carrier pivoted to the frame of the harvester below the binding-table, a stop for engaging the carrier and holding the same in a position to receive the sheaves, connecting mechanism, substantially as described, between the driving-shaft and stop for automatically disengaging said stop and permitting the carrier to tilt and discharge the sheaves upon the accumulation of a predetermined number of said sheaves upon the carrier, an arm or joint having a double-hinged connection with the carrier, and a spring secured to the frame of the harvester and connected with the end of said link and operating to return said carrier to a position to be engaged by the stop when the sheaves have been discharged, all constructed, arranged, and operating substantially as shown and described.

2. In a harvester-binder, the combination, with a sheaf-carrier having a double-hinged connection with the harvester-frame, of a stop for holding the carrier in position to receive the sheaves, mechanism for automatically disengaging the stop and permitting said carrier to discharge the sheaves upon the accumulation of a predetermined number thereon, an arm or joint having a double-hinged connection with the carrier, and a spring secured to the frame of the harvester and having a swivel-connection with the hinged arm or joint, all constructed, arranged, and operating substantially as shown and described, whereby when not in operation the carrier may be folded up by the side of the harvester.

3. In a harvester-binder, the combination, with an adjustable binder-table, a rock-shaft mounted in bearings attached to said table, and crank-arms secured to the rock-shaft, of a sheaf-carrier pivoted to the frame of the harvester, a stop for holding said carrier in position to receive the sheaves, a crank-arm connected with said stop, a swivel mounted in the end of said crank-arm and having an aperture therethrough, a rod secured to the rock-arms and passing through the aperture in the swivel, and mechanism for rocking the rock-shaft to disengage the stop from the carrier to permit said carrier to discharge the sheaves, all constructed, arranged, and operating substantially as shown and described.

4. In a harvester-binder, the combination, with a binding-table, a driving-shaft, and an ejector operated by said shaft, of a sheaf-carrier pivoted to the frame of the harvester below the binding-table, a spring-actuated stop for engaging the carrier and holding it in a position to receive the sheaves, a spindle projecting from a bracket supported on the binding-table, a gear mounted on said spindle, a ratchet formed on the side of the gear and a pawl engaging therewith, a clutch loosely mounted on said spindle, a spring holding said clutch in engagement with the gear, a lever for disengaging said clutch, a cam projection formed on the clutch, a pivoted trip-lever adapted to be engaged by the cam projection, a rock-shaft mounted in bearings on the binding-table and having a crank portion, a link connecting the trip-lever with the crank of the rock-shaft, rock-arms projecting from said rock-shaft and connected with the stop engaging the carrier, and a segment-pinion rigidly mounted on the driving-shaft and adapted to engage with the gear mounted on the spindle, all constructed, arranged, and operating substantially as shown and described, whereby as the rock-shaft is rocked through the mechanism described the stop will be disengaged from the carrier and permit said carrier to tilt and discharge the sheaves.

5. In a harvester-binder, the combination, with a binding-table, a driving-shaft, and an ejector operated by said driving-shaft, of a sheaf-carrier pivoted to the frame of the harvester below the binding-table, a spring-actuated stop for engaging the carrier and holding the same in a position to receive the sheaves, a bracket supported from the binding-table, a spindle secured to and projecting from said bracket parallel to the driving-shaft, a gear mounted on said spindle, a ratchet formed on one side of said gear, a pawl engaging said ratchet, a clutch-section formed on the opposite side of the gear, a short sleeve loosely mounted on the spindle and having a clutch-section formed on its end next to the gear, a spring holding said clutch-sections normally in engagement, a collar splined on the spindle and keyed to the sleeve, a cam-slot in said collar, a lever pivotally secured to the spindle and engaging the cam-slot, a cam projection on the short sleeve, a pivoted trip-lever adapted to be engaged by said cam projection, a rock-shaft having a crank, a link connecting the trip-lever and crank of the rock-shaft, rock-arms secured to said rock-shaft, mechanism connecting the rock-arms with the spring-actuated stop, and a segment-pinion rigidly mounted on the driving-shaft and adapted to engage the gear on the spindle, all constructed, arranged, and operating substantially as shown and described, as and for the purpose set forth.

6. In a harvester-binder, the combination, with a binding-table, a driving-shaft, and an ejector operated by said shaft, of a sheaf-carrier pivoted to the harvester-frame below the binding-table, a short vertical shaft mounted in a bearing secured to the frame, a crank-stop arm on the lower end of said shaft, a spring holding said stop normally in engagement with the carrier to retain it in position to receive the sheaves, a crank-arm on the upper end of the vertical shaft, a swivel mounted on said crank-arm and having a transverse aperture therethrough, a rock-shaft mounted in bearings on the binding-table, rock-arms secured to said rock-shaft, a rod connecting said rock-arms and passing through the aperture in the swivel, and connecting mechanism, substantially as described, between the rock-shaft and driving-shaft for rocking said rock-shaft when a predetermined number of sheaves have accumulated upon the carrier, all constructed, arranged, and operating substantially as shown and described, whereby when said rock-shaft is rocked the stop will be disengaged from the carrier and permit it to tilt and discharge the sheaves.

7. The combination, with a harvester-frame, of a casting pivoted to said frame and having a bearing formed therein, a sheaf-carrier having a projecting journal mounted in said bearing, and a stop on the frame adapted to engage with the casting and hold the carrier in an operative or an inoperative position, all constructed, arranged, and operating substantially as shown and described.

8. The combination, with a harvester-frame, a casting pivoted thereto, and a bearing formed in said casting, of a sheaf-carrier having an inwardly-projecting journal secured to its forward inner corner and mounted in the bearing in the casting, a stop or pin adapted to engage the casting and hold the carrier in an operative or an inoperative position, and a guard-board hinged to the inner side of the carrier next to the frame, all constructed, arranged, and operating substantially as shown and described.

9. The combination, with the frame of a harvester and an arm projecting from the side of said frame, of a casting pivoted at one end to the rear of said arm, a bearing formed in said casting, a sheaf-carrier having an inwardly-projecting journal secured to its inner forward corner and mounted in the bearing in the casting, and a stop or pin adapted to engage with the casting to secure the carrier in an operative or an inoperative position, all constructed, arranged, and operating substantially as shown and described, as and for the purpose set forth.

10. The combination, with a harvester-binder having lugs secured to and projecting from its side bar below the binding-table and adapted to have a tongue attached to said lugs, of a sheaf-carrier having a double-hinged connection with the harvester-frame, and a stop for holding said carrier in an operative or an inoperative position, all constructed, arranged, and operating substantially as shown and described, whereby when the carrier is in an inoperative position it will be raised above the tongue-lugs.

In testimony whereof I affix my signature in presence of two witnesses.

CHARLES MAGNUS PETERSON.

Witnesses:
JOHN PETERSON,
L. M. JOHNSON.